April 20, 1943.　　　T. A. HIGBY　　　2,317,057
PNEUMATIC SPRING
Filed Aug. 30, 1941
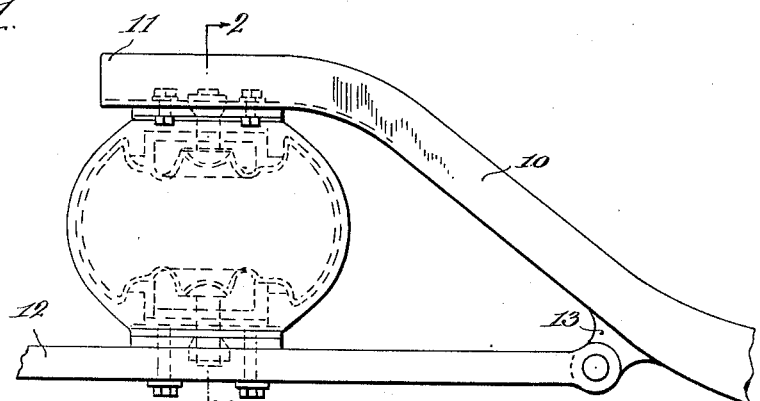
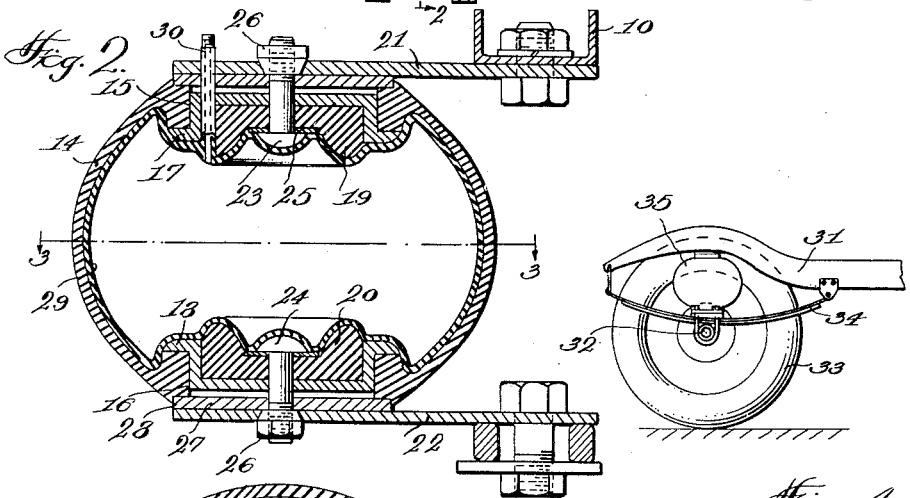
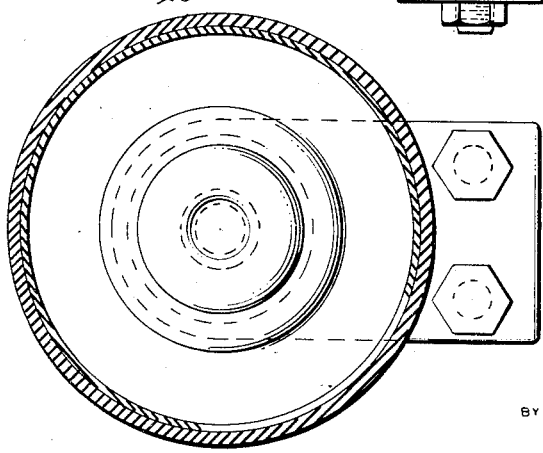
Tracy A. Higby
INVENTOR
BY Victor J. Evans & Co.
ATTORNEYS Patented Apr. 20, 1943

2,317,057

UNITED STATES PATENT OFFICE 2,317,057

PNEUMATIC SPRING

Tracy A. Higby, Boise, Idaho

Application August 30, 1941, Serial No. 409,072

3 Claims. (Cl. 267—65)

My invention relates broadly to new and useful improvements in springs and more particularly to improvements in springs of the pneumatic type.

An important object of my invention is the provision of a spring that is noiseless and that will not require lubrication, the spring being unique to increasingly resist a load applied thereto and including means rendered operative only after a predetermined peak load has been applied to the spring to abruptly, yet yieldingly prevent complete collapse thereof.

Another object of my invention is the provision of a spring that may be inserted between any relatively movable parts to snub or dampen movement of the parts relative to each other, the said spring including an inflatable casing which is unique in its construction to permit the pressure of the fluid therein to be varied in accordance with the load that is to be applied thereto.

Still another object of my invention is the provision of a spring of the above mentioned character that is simple in its construction, inexpensive to manufacture, and efficient and efficacious in the performance of its duties.

Other objects and advantages of my invention will be apparent during the course of the following description.

In the accompanying drawing, forming a part of this specification, and in which like numerals are employed to designate like parts throughout the same, Figure 1 is a front elevation of a spring embodying my invention and showing the same applied to the frame of an automotive vehicle.

Figure 2 is a vertical sectional view taken on the line 2—2 of Figure 1.

Figure 3 is a transverse sectional view taken on the line 3—3 of Figure 2, and

Figure 4 is a view similar to Figure 1 but illustrating a modification of the manner of mounting the spring.

In the drawing wherein for the purpose of illustration is shown a preferred embodiment of my invention, the numeral 10 designates a portion of the framework of an automotive vehicle. As illustrated in Figure 2, the frame member 10 is channel shape in transverse section and the free end 11 thereof is arranged colaterally above the main intermediate body portion of the frame. A wheel supporting member 12 has one end thereof pivotally attached to the lug 13 projecting from the main intermediate body portion of the frame and substantially below the distal end 11 thereof. The frame member 10 and wheel supporting member 12 have been here illustrated merely for the purpose of showing a mechanical arrangement with which the spring embodying my invention may be operatively associated. It will be readily apparent that the construction hereinabove described provides a supporting means that includes two relatively movable parts. The construction has been described as comprising a part of an automobile framework which requires that a spring be inserted between the relatively movable parts 11 and 12.

The spring comprising the present invention includes an essentially tire shaped outer casing 14 of rubber or other suitable yieldable or collapsible material. I have found that the conventional four-ply standard tire having approximately a three inch air core provides a suitable casing for use in the type of supporting structure illustrated in the drawing. The tire is formed centrally at opposite sides thereof with openings 15 and 16 in which the cups 17 and 18 respectively are seated. The annular body portions of the cups have a snug fitting peripheral engagement with the side walls of their respective openings and the bottom thereof constitutes a closure for the opening. The portion of the side walls of the cups extending into the tire are bent outwardly to extend radially therefrom and to abuttingly engage the inner surface of the tire.

Bumpers 19 and 20 are disposed within the cups. These bumpers are arranged in confronting relation with each other and are preferably formed from hard rubber or like material. Each of the bumpers is formed with an inwardly projecting annular rib which extends substantially inwardly from the edges 17 and 18 of the supporting cups. In the event that the casing is substantially collapsed the annular rib portions 19 and 20 of the upper and lower bumpers will move into engagement with each other to yieldably resist further collapse of the casing and to prevent any metallic parts of the construction from engaging other metallic parts. By preventing any metal to metal contact I have assured an inherently noiseless spring construction both under normal conditions and under conditions where an excessive load is applied thereto.

The supporting arms 21 and 22 have one end bolted or otherwise fixedly secured to the end 11 of the frame and to the wheel supporting member 12 respectively. The supporting arms extend in a horizontal plane to receive the casing 14 intermediate the outer ends thereof. The bolts 23 and 24 have the enlarged head portions thereof seated within the concavity defined by the ribs 19 and 20 of the bumpers. The screw threaded shanks of the bolts extend outwardly through the bumpers and through the bottom walls of the cup members to be received within openings provided in the supporting arms. By reason of the fact that the bumpers are preferably formed of rubber, washers 25 or the like are interposed between the heads of the bolt elements and the confronting surface of the bumpers to prevent the heads from being pulled through the bumpers. The shanks of the bolts extend substantially beyond the supporting arms to screw threadedly receive the nuts 26 which are threaded into engagement with the arms to hold the same rigidly affixed to the casing.

I prefer that each of the arms be provided with a disk shaped plate 27 fixedly secured to the inner sides thereof. The plate is of a diameter slightly larger than the diameter of the openings 15 and 16 in the casing and the peripheral edge thereof seats in an annular recess 28 surrounding the openings at their outer ends. Thus when the nuts 26 are threaded onto the shanks of the bolts 23 and 24, the bumper carrying cups 15 and 16 and the disk shaped plates 28 will be drawn toward each other to clampingly engage the casing.

An inner inflatable casing or liner 29 is disposed within the casing and the air valve 30 thereof extends upwardly through the bumper 19, cup 15 and supporting arm 21 laterally of the upper bolt element 23. When air under pressure is introduced into the liner, it will lie flatly against the inner wall of the casing in the manner illustrated in Figure 2. A pressure commensurate with the load to which the spring will be subjected is maintained within the liner and it is obvious that this pressure may be varied in accordance with the exigencies of the particular situation. Under normal operating conditions the air pressure in the casing will be sufficient to prevent complete collapse of the spring. However, in the event that a load exceeding the maximum load which the spring may sustain without collapsing is applied to the relatively movable members supporting the spring, the inwardly projecting annular ribs of the bumpers will move into engagement with each other to effectively but yieldingly prevent further collapse of the casing. The manner in which the bumpers extend into the casing prevents metal to metal contact between the cups 15 and 16 whereby to prevent the grating or rasping noise which would result if the flared ends 17 and 18 of the cups contacted each other when the casing collapsed. In addition to the above, the bumpers are inherently springy to gradually absorb the excessive load applied to the spring, thereby eliminating the abrupt shock which would result if the bumpers were not provided and the casing were collapsed.

In Figure 4 I have illustrated a modification of the mounting means for the spring. The numeral 31 designates a portion of the frame of an automotive vehicle. The portion of the frame illustrated is arranged above and at right angles to the axle 32 on which the wheel 33 is mounted. A leaf spring 34 has the opposite ends thereof attached to the frame at opposite sides of the axle and the middle portion thereof seats against and is supported by the axle. A pneumatic spring 35 constructed and operating in the manner described above is interposed between the frame member 31 and the axle 32 to supplement the spring action of the leaf spring 34. When the pneumatic spring is used in this capacity it will snub or dampen the rebound of the leaf spring and will gradually absorb the compressive load to which the leaf spring is subjected.

It is to be understood that the form of my invention herewith shown and described is to be taken as a preferred example of the same, and that various changes in the size, shape and arrangement of parts may be resorted to without departing from the spirit of my invention or the scope of the appended claims.

What I claim is:

1. A pneumatic spring, comprising two spaced movable plates, a pneumatic casing between the plates with oppositely disposed openings closed by said plates, cups for clamping the pneumatic casing to the plates, resilient bumper elements within the cups and extending into the pneumatic casing, and means passing through the plates, cups and resilient bumper elements for drawing the bumper elements tightly within the cups for clamping the pneumatic casing to the plates.

2. A pneumatic spring, comprising two spaced movable plates, a pneumatic casing between the plates with oppositely disposed openings closed by said plates, cups for clamping the pneumatic casing to the plates, resilient bumper elements within the cups and extending into the pneumatic casing with central depressions, and securing bolts passing through the plates, cups and resilient bumper elements with their heads within the depressions in the resilient bumper elements, whereby the pneumatic casing is tightly clamped to the plates.

3. A pneumatic spring, comprising two spaced movable plates, a pneumatic casing between the plates with oppositely disposed openings closed by the plates, cups having outwardly extending flanges clamping the pneumatic casing to the plates, resilient bumper elements within the cups and extending into the pneumatic casing with central depressions in their inner faces, and securing bolts passing through the plates, cups and resilient bumper elements with their heads within the depressions in the resilient bumper elements, whereby the cups may be tightly drawn against the plates with the casing between the same.

TRACY A. HIGBY.